(12) United States Patent
Tisserand et al.

(10) Patent No.: US 12,455,191 B2
(45) Date of Patent: Oct. 28, 2025

(54) MULTISPECTRAL IMAGER WITH ENLARGED SPECTRAL DOMAIN

(71) Applicant: SILIOS TECHNOLOGIES, Rousset (FR)

(72) Inventors: Stéphane Tisserand, Aubagne (FR); Laurent Roux, Marseilles (FR)

(73) Assignee: SILIOS TECHNOLOGIES, Rousset (FR)

( * ) Notice: Subject to any disclaimer, the term of this patent is extended or adjusted under 35 U.S.C. 154(b) by 156 days.

(21) Appl. No.: 18/039,052

(22) PCT Filed: Nov. 18, 2021

(86) PCT No.: PCT/FR2021/052036
§ 371 (c)(1),
(2) Date: May 26, 2023

(87) PCT Pub. No.: WO2022/112688
PCT Pub. Date: Jun. 2, 2022

(65) Prior Publication Data
US 2024/0102861 A1  Mar. 28, 2024

(30) Foreign Application Priority Data
Nov. 30, 2020 (FR) ...................................... 2012418

(51) Int. Cl.
*G01J 3/26* (2006.01)
*G01J 3/28* (2006.01)
*G01J 3/12* (2006.01)

(52) U.S. Cl.
CPC ............... *G01J 3/2823* (2013.01); *G01J 3/26* (2013.01); *G01J 2003/1239* (2013.01); *G01J 2003/2806* (2013.01); *G01J 2003/2826* (2013.01)

(58) Field of Classification Search
CPC .... G01J 3/2823; G01J 3/26; G01J 2003/1239; G01J 2003/2806; G01J 2003/2826;
(Continued)

(56) References Cited

U.S. PATENT DOCUMENTS 10,295,482 B1 * 5/2019 Chen ...................... G02B 3/005
2009/0321865 A1 * 12/2009 Kasano ................ H04N 25/133
359/359
(Continued)

FOREIGN PATENT DOCUMENTS

DE  112013002560  2/2015
JP  2016528496 A  9/2016
(Continued)

OTHER PUBLICATIONS

International Search Report, Application No. PCT/FR2021/052036, mailed Feb. 28, 2022 (3 pages).
(Continued)

*Primary Examiner* — Jonathan M Hansen
(74) *Attorney, Agent, or Firm* — Falcon Rappaport & Berkman LLP (57) ABSTRACT

A multispectral imager is provided, designed for analyzing a spectral domain of interest, comprising an image sensor formed of an array of macropixels and comprising a first and a second photosensitive pixel respectively dedicated to a first and a second spectral band, and a filtering structure comprising a first and second interference filter which are superimposed respectively on the first and second photosensitive pixel and which are arranged to respectively transmit a first and second electromagnetic radiation belonging respectively to the first and second spectral bands, the multispectral imager in which a wavelength half of that of the second electromagnetic radiation is located in the spectral domain of interest, and a filtering layer is superimposed
(Continued)

on the second photosensitive pixel and configured to block the passage of a third electromagnetic radiation of wavelength half that of the second electromagnetic radiation.

12 Claims, 6 Drawing Sheets

(58) Field of Classification Search
CPC .......... G01J 3/0227; G01J 3/0262; G01J 3/12; G01J 2003/2809; G01J 3/2803
See application file for complete search history.

(56) References Cited

U.S. PATENT DOCUMENTS

| | | | |
|---|---|---|---|
| 2015/0138560 A1* | 5/2015 | Kasahara | G01J 3/2803 356/451 |
| 2017/0005132 A1 | 1/2017 | Vereecke et al. | |
| 2017/0125614 A1* | 5/2017 | Sik | G02B 5/281 |
| 2017/0163901 A1* | 6/2017 | Lin | G06V 10/56 |
| 2017/0227398 A1 | 8/2017 | Bartosewcz et al. | |
| 2019/0035947 A1* | 1/2019 | Wang | H10F 77/334 |
| 2019/0145823 A1 | 5/2019 | Tisserand et al. | |
| 2020/0109991 A1 | 4/2020 | Tack et al. | |
| 2024/0102861 A1* | 3/2024 | Tisserand | G01J 3/12 |

FOREIGN PATENT DOCUMENTS

| | | |
|---|---|---|
| JP | 2018155961 A | 10/2018 |
| JP | 2019515271 A | 6/2019 |
| WO | 2015159651 A1 | 10/2015 |
| WO | 2016009925 A1 | 1/2016 |
| WO | 2017187029 | 11/2017 |
| WO | 2020179282 A1 | 9/2020 |

OTHER PUBLICATIONS

Search Report, FR Application 2012418, Aug. 2, 2021 (2 pages).
Office Action, Japanese Application No. 2023-532573, mailed May 14, 2024 (7 pages).
Office Action from JP Application 2023-532573, Nov. 19, 2024.
European Patent Office Official Letter for European Patent Appl. No. 21 823 963.0 (Jun. 20, 2025).

* cited by examiner

MULTISPECTRAL IMAGER WITH ENLARGED SPECTRAL DOMAIN

CROSS REFERENCE TO RELATED APPLICATIONS

This application is the U.S. National Stage of International Application Number PCT/FR2021/052036 filed on Nov. 18, 2021, which application claims priority under 35 USC § 119 to French Patent Application No. 2012418 filed on Nov. 30, 2020. Both applications are hereby incorporated by reference in their entirety.

TECHNICAL FIELD

The invention relates to a multispectral imager capable of instantly obtaining two-dimensional images whose spectrum is resolved at each point.

BACKGROUND OF THE INVENTION

Many applications in astronomy, mineralogy, chemistry, and agriculture require the acquisition of spectral images of objects or scenes, i.e. images spectrally limited to specific bands of the electromagnetic spectrum, in the visible, infrared or ultraviolet.

Multispectral or hyperspectral imagers make it possible to obtain such images, which consist in two-dimensional images whose spectrum is extracted at each point.

The term hyperspectral imaging is conventionally used when the extracted spectra are very resolved, that is to say formed of numerous (typically more than 100) relatively narrow spectral bands (typically 5 to 15 nm), and multispectral imaging when the spectra are formed of fewer spectral bands (typically between 4 and 20) that are relatively wide (typically 15 to 40 nm).

A first method for obtaining multispectral images is to employ a scanner comprising a one-dimensional sensor scanning a scene to be analyzed, called a "push broom scanner".

A second method is to employ a two-dimensional array of elementary photosensitive sensors, so-called "FPA" for Focal Plane Array, in order to perform instantaneous multispectral imaging, or "snapshot imaging", a method for capturing images in a single integration period of the sensor array, The present invention lies in the context of obtaining multispectral images according to this second method, wherein the patent document US 2019/0145823 discloses a multispectral imager based on an image sensor comprising a two-dimensional array formed of an array of photosensitive pixels, and of a set of elementary filters each associated with one of the photosensitive pixels.

The photosensitive pixels are each dedicated to a given spectral band, that is to say intended to receive and measure radiation of wavelength comprised in this band, the set of photosensitive pixels dedicated to a single spectral band forming a sub-image, each point of which belongs to one of a plurality of macro-pixels each formed of a group of pixels and associated filters.

Structurally, each elementary filter is superimposed on that of the photosensitive pixels to which it is associated, defining its spectral band by filtering the incident electromagnetic radiation, Here, the elementary filters are each constituted by a Fabry-Perot interference filter.

Devices such as those of US 2019/0145823 are designed to analyze only spectral domains of relatively small extents, approximately 300 nm wide, in order to keep one spectral band from polluting another.

In practice, in order to study, for example, the spectral domain from 400 to 1000 nm (visible and near-infrared domain), there are therefore two distinct multispectral imagers, for example dedicated to the 400-700 nm and 700-1000 nm spectral domains respectively.

It would be desirable for a single device to be capable of implementing multispectral imaging for an enlarged spectral domain.

Patent application US 2017/0163901 A1 relates to a multispectral imaging system resting on an optic making it possible to form a plurality of small-sized images each forming a duplicate of an image of a scene to be analyzed, each thumbnail image being detected by a separate portion of a colored image capture element, as well as on a combination between narrow passband filters and color filters integrated into the image capture element.

Patent documents US 2015/0138560 A1 and DE 112013-002-560 T5 relate to a spectroscopic sensor comprising two facing mirrors forming a laser cavity.

SUMMARY OF THE DISCLOSURE

The object of the present invention is to increase the extent of the spectral domain analyzable by a single multispectral imager.

The invention relates more particularly to a multispectral imager designed to analyze a spectral domain of interest comprising a first spectral band and a second spectral band distinct from the first spectral band, comprising an image sensor formed of an array of macropixels (110) each comprising a first photosensitive pixel and a second photosensitive pixel dedicated respectively to the first spectral band and to the second spectral band distinct from the first spectral band, and a filtering structure which comprises a first interference filter and a second interference filter which are superimposed on the first photosensitive pixel and the second photosensitive pixel, respectively, and which are arranged to respectively transmit a first electromagnetic radiation belonging to the first spectral band and a second electromagnetic radiation belonging to the second spectral band, the multispectral imager being characterized in that a wavelength half that of the second electromagnetic radiation lies in the spectral domain of interest, and in that the multispectral imager further comprises a filtering layer which is superimposed on the second photosensitive pixel and which is configured to block the passage of a third electromagnetic radiation of wavelength half that of the second electromagnetic radiation.

An essential advantage of a multispectral imager according to the invention is its capacity to analyze an enlarged spectral domain without undergoing pollution due to the second-order resonances of the interference filters.

Furthermore, such a multispectral imager does not require a particular image sensor and can therefore be based on standard commercial image sensors, facilitating development and considerably reducing the cost of this imager.

A multispectral imager having such a structure, with operation based on the use of macro-pixels and a pixel-structured filtering layer, has other advantageous features.

It makes it possible to use the entire photosensitive surface of the sensor, thus bringing about excellent spatial resolution.

Furthermore, such a structure involves close proximity between the image sensor, the interference filtering structure and the filtering layer, thus ensuring almost no problems related to the respective viewing angles of each of the pixels of a scene to be captured.

The multispectral imager according to the invention may have the following features:
  the wavelength half of that of the second electromagnetic radiation may be in the first spectral band;
  the filtering layer may form a high-pass filter configured to block the first electromagnetic radiation and transmit the second electromagnetic radiation;
  the filtering layer may be structured so as not to be superimposed on the first photosensitive pixel;
  the filtering layer may consist of a layer of red organic material;
  the filtering layer may be formed of a mosaic of elementary filters, may further be superimposed on the first photosensitive pixel and be configured to transmit the first electromagnetic radiation to the first photosensitive pixel;
  the filtering layer may comprise an array of organic filters configured to each transmit a spectral band in the visible spectral domain;
  the organic filters can be configured to transmit blue, green and red radiation bands respectively; and
  the array of organic filters may be a Bayer array.

BRIEF DESCRIPTION OF THE DRAWINGS

The present invention will be better understood and other advantages will become apparent on reading the detailed description of the embodiments by way of non-limiting example and shown by the appended drawings, wherein:

FIGS. 2 (in A, C and D) and 3 (in A, B and C) illustrate spectral responses of optical filters, with transmission percentages on the Y-axis and wavelengths on the X-axis, expressed in nanometers.

DETAILED DESCRIPTION

Figure 1A:
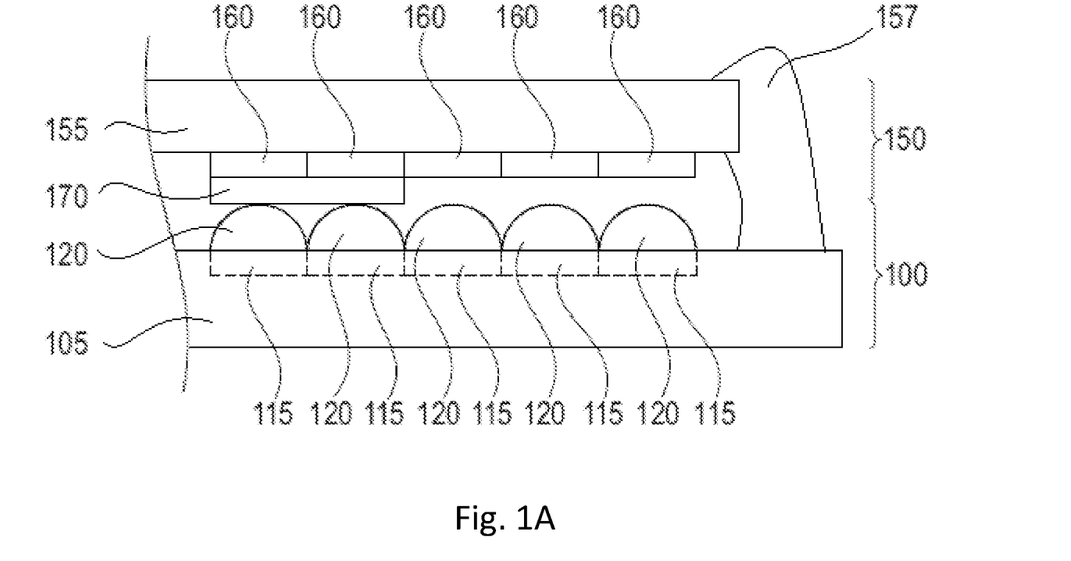
FIG. 1A shows a cross sectional view of a multispectral imager according to a first embodiment of the invention.

FIG. 1A illustrates a sectional view of the structure of a multi-spectral imager with 16 channels according to the invention, with an image sensor 100 comprising a sensor substrate 105, an array of photosensitive pixels 115 formed on and/or in this substrate, dedicated respectively to one of sixteen spectral bands of interest, centered respectively on wavelengths $\lambda_1$ to $\lambda_{16}$, and a filtering structure 150 comprising a substrate, filter 155 and an array of interference filters 160 formed on this substrate and a filtering layer 170 formed on the interference filters 160.

It is the combination of the array of interference filters and of the filtering layer which specialize the sensitivity of the photosensitive pixels to the incident radiation, thus dedicated each one to a given spectral band.

Figure 1B:
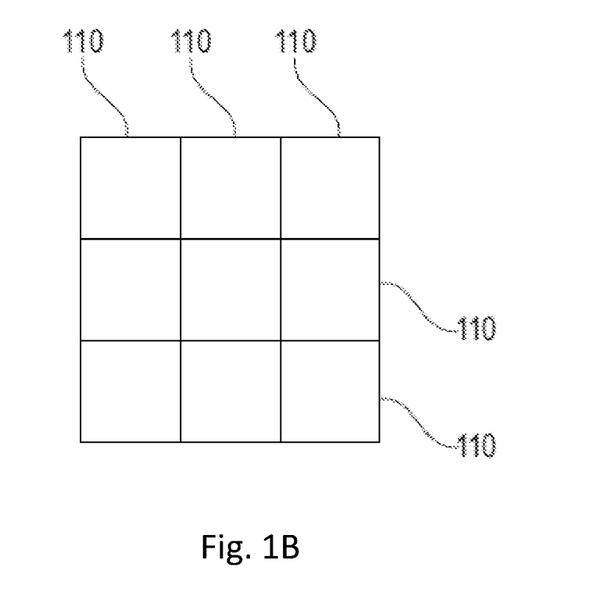
FIG. 1B shows a plan view of an array of macro-pixels of the spectral imager in FIG. 1A.

A plurality of macro-pixels 110 forming an array of macro-pixels shown by FIG. 1B are each formed of a group of pixels, each dedicated to one of the spectral bands of interest, and associated filters.

Figure 1C:
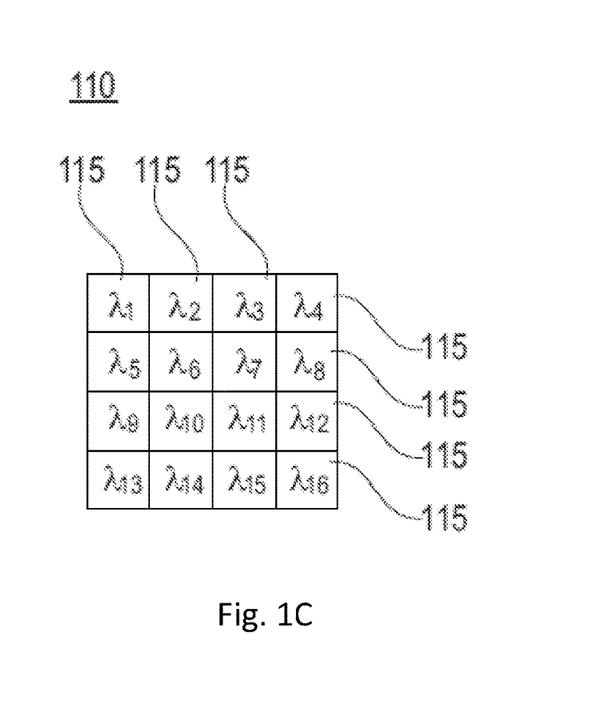
FIG. 1C shows a macro-pixel of FIG. 1B.

FIG. 1C illustrates, in a plan view of one of these macro-pixels 110, each formed of a 4×4 array of the photosensitive pixels 115, the photosensitive pixels being designated by the central wavelengths $\lambda_1$ to $\lambda_{16}$ of the 16 spectral bands to which they are respectively dedicated, 430, 468, 506, 544, 582, 620, 658, 696, 734, 772, 810, 848, 886, 924, 962 and 1000 nm.

Figure 2:
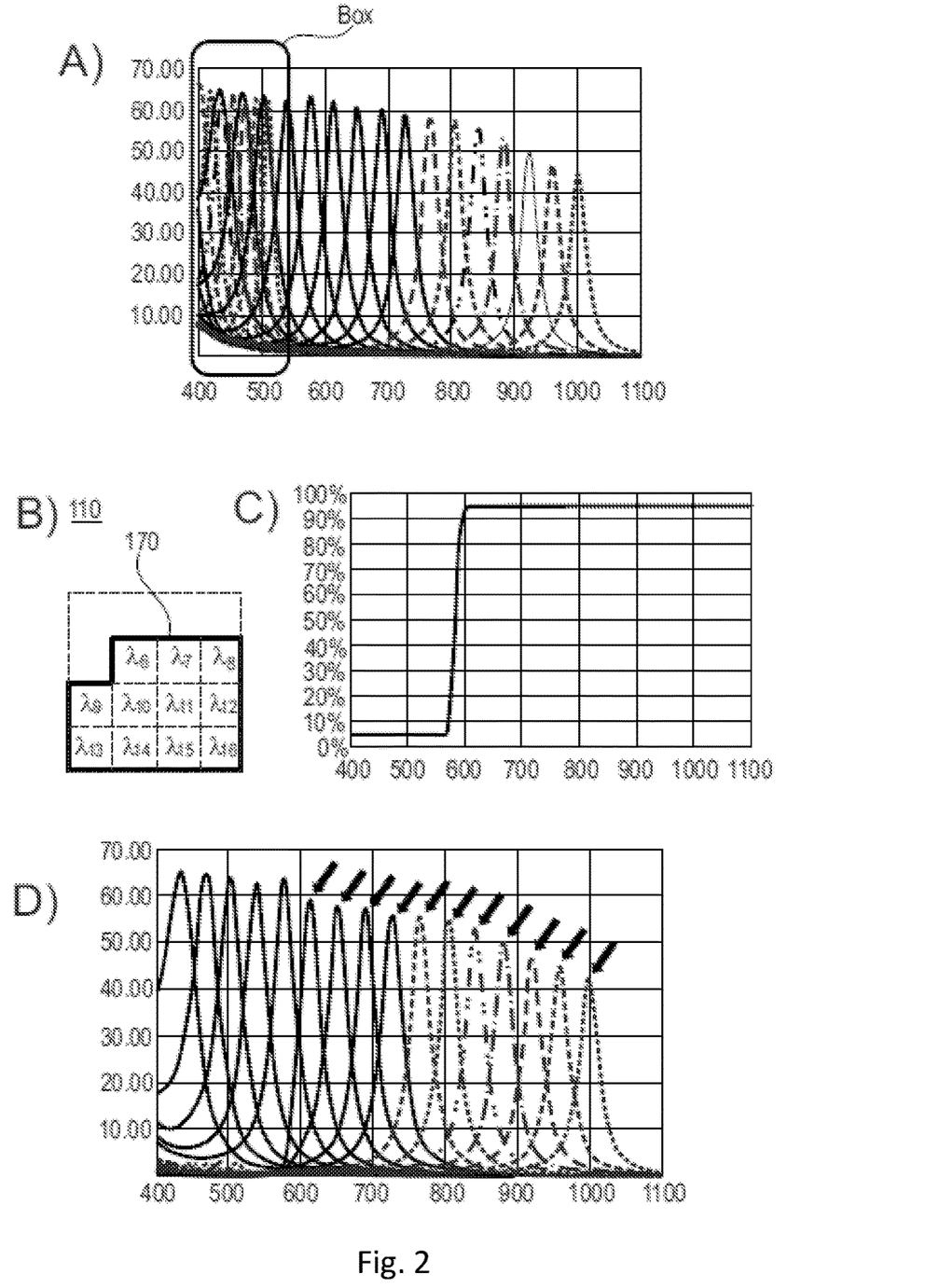
FIG. 2 shows the features of the multispectral imager in FIG. 1A.

The filtering layer 170 could take a continuous form or be composed of discrete elements such as a mosaic of elementary filters, and may or may not have a homogeneous composition and properties over its entire extent; it is here formed homogeneously from a red organic resin structured to be superimposed on the photosensitive pixels dedicated to the spectral bands centered on the high wavelengths $\lambda_1$ to $\lambda_{16}$ and to be absent at the pixels dedicated to the spectral bands centered on the low wavelengths $\lambda_1$ to $\lambda_5$, as shown by FIG. 2 in B) which represents the filtering layer 170 on the scale of a macro-pixel 110.

The filtering layer 170 here forms a high-pass organic filter, with a cut-off wavelength located at about 590 nm, as shown by FIG. 2 in C), but any type of filter could be employed, such as for example absorption, reflection, interference or plasmonic filters, provided that they have a suitable spectral response (high-pass here) and that they can be structured at the scale of the photosensitive pixels.

When a filter is said to be superimposed on a photosensitive pixel, it should be understood here that this filter is shifted from the pixel in a direction perpendicular to its plane of formation and located so as to intercept the incident radiation on that pixel to block or transmit it.

In this document, the terms "block" and "transmit" are not to be understood in the senses of total blocking and total transmission, but must be understood according to the use of the field of optical filters, such as for example by blocking at least 80% and transmitting at least 30% of an electromagnetic radiation, which corresponds to the examples considered in this description.

Thus, when it is said that a filtering layer superimposed on a photosensitive pixel is configured to transmit a radiation to that photosensitive pixel, it will be understood that such filtering layer is transparent to that radiation (transmitting at least 30% of that radiation) and allows it to pass through it to irradiate that photosensitive pixel.

This does not prevent a first element forming a first part of the filtering layer from being able to transmit a first radiation of given wavelength and does not prevent a second element forming a second part of the filtering layer from being able to block a second radiation of that given wavelength.

The imager may further comprise a microlens array 120 reproducing the arrangement of the photosensitive pixels so that, at each pixel corresponds to one and only one of the lenses, and configured to concentrate the incident radiation on the photosensitive surfaces of the photosensitive pixels, thus increasing the sensitivity of the imager.

The elements of this imager require close proximity between the image sensor, the interference filtering structure, and the filtering layer, so that the paths of incident radiations respectively pass through a photosensitive pixel and an interference filter which is superimposed thereon, even with a significant angle of incidence (greater than 30° for example) while limiting the phenomena of crosstalk (when radiation intended to be received by a given pixel is polluted by radiation intended to be received by a neighboring pixel), Such a proximity may be obtained by direct contact between the elements (160, 170) formed on the sensor substrate 105 and the elements (115, 120) formed on the filter substrate 155, or optionally via thin protective layers, then by attaching the substrates (105, 155) to one another by means of a strip of glue 157 located on the periphery of these substrates (105, 155).

The elements 160, 170, 115 and 120 are interposed between the two substrates 105 and 155 in order not to be separated by the thickness of one or two of these substrates and to maintain the necessary proximity.

In practice, the imager shown in FIG. 1A is associated with an optical focusing system (not shown) comprising one or several lenses located at a distance from the photosensitive pixels 115 and the interference filters 160 and their substrate 155.

The interference filters may, for example, be Fabry-Perot filters, formed of a resonant cavity comprised between two mirrors, Such a filter transmits electromagnetic radiation if it enters into resonance in the cavity, that is, the condition that its wavelength belongs to a spectral band centered on a given wavelength defined by the following formula [1]:

$$\lambda_k = 2 n_{\lambda_k} \cdot e / k \quad [1]$$

wherein k is an integer greater than or equal to 1 which defines the considered resonance order, $n_{\lambda_k}$ is the refractive index of the cavity for the wavelength $\lambda_k$, and e is the physical thickness of the cavity.

The width of the spectral band transmitted by such a filter is characterized by the height at mid-height of a resonance peak, which may range from a few nanometers to several tens of nanometers, and depends on the structure and materials used for the filter.

For k=1, it is a first-order resonance, the nominal transmission band of the filter being the band centered on $\lambda_1$. However, other resonance orders satisfying the transmission condition of the formula [1] are associated with the integers k greater than 1: second-order for k being equal to 2, third-order for k being equal to 3, etc.

By allowing the transmission of radiation of corresponding wavelengths, second-order resonance orders in practice limit the spectral range that a given multispectral imager will be able to analyze.

Indeed, an interference filter designed to transmit as useful signal a first radiation by virtue of a first-order resonance also will transmit a second radiation of wavelength approximately half (within the scattering index of refraction) that of the first radiation due to the second-order resonance, which pollutes the measurement of the useful signal to the point of making it unusable.

Thus, in order to keep the signal from being polluted by the presence in the spectral domain analyzed by the multispectral imager of wavelengths that are approximately shorter by half than other wavelengths of that same domain, the extent of the analyzable spectral domain is limited to exclude the latter, by the use of an overall high-pass filter covering all of the photosensitive pixels or by the characteristics of the material used for detecting radiation, such as silicon in the case of CMOS detection technology.

This way, a wavelength twice as short as that of an electromagnetic radiation located in a high spectral band (in terms of wavelength) of the spectral domain analyzed is prevented from being located in a low spectral band (in terms of wavelength) of that same spectral domain.

In fact, to generally block the radiation transmitted by the second-order resonances of the filters dedicated to the high spectral bands, on the scale of the whole multispectral imager, amounts to blocking the low spectral bands that could be analyzed with that same multispectral imager.

FIG. 2 shows a graph showing the spectral responses of the 16 interference filters associated with the 16 photosensitive pixels in a spectral domain extending from 400 to 1100 nm, with the transmission peaks due to the first- and second-order resonances, of widths at mid-height comprised between 20 and 50 nm.

In this example, in the absence of the filtering layer 170, radiations of wavelengths lower than approximately 550 nm would be transmitted to the photosensitive pixels dedicated to high wavelengths (that is relatively long wavelengths) due to the second-order resonances of the associated interference filters, as indicated by the resonance peaks of the Box where the first-order resonance peaks of the low wavelengths (that is of relatively short wavelengths) and the second-order resonance peaks of the interference filters with nominal transmissions corresponding to the high wavelengths are superimposed.

In the present invention, the filtering layer 170 resolves the problem of polluting the useful signals of the high spectral bands (in terms of wavelength) by blocking the radiation of shorter wavelengths, not generally for all the photosensitive pixels, but specifically at the photosensitive pixels dedicated to these high spectral bands, while allowing the radiation of the low spectral bands (in terms of wavelength) to pass through the photosensitive pixels dedicated to these low spectral bands.

In concrete terms, the filtering layer 170 is, in this embodiment, structured at the photosensitive pixels individually, so as to be superimposed only on the pixels dedicated to the high spectral bands, being absent at the level of the pixels dedicated to the low spectral bands.

In fact, the filtering layer 170 has an array structure, each element of which reproduces, in its geometry and dimensions, the structure of the macro-pixels 110, the structure formed in this example being an array of 4×4 photosensitive pixels 115.

Thus, the filtering layer 170 is here formed of elements superimposed respectively on the photosensitive pixels 115 dedicated to the wavelengths $\lambda_6$ to $\lambda_{16}$ respectively, each element corresponding to a photosensitive pixel and vice versa.

In this particular embodiment, these elements form a continuous filtering layer 170 at the scale of a macro-pixel 110, superimposed on a first portion of only one macro-pixel 110 so as not to intercept incident radiation passing through a second portion of the same macro-pixel, as shown in B) of FIG. 2.

Thus, a multispectral imager according to the invention can analyze an enlarged spectral domain ranging for example from 400 to 1000 nm, with a larger extent than those of conventional multispectral imagers, without suffering from the contamination phenomenon described above.

FIG. 2 illustrates in d) the spectral response of the combination according to the invention between the interference filters 160 and the filtering layer 170 consisting of the high-pass filter shown in B), designed to block the radiations corresponding to the second-order resonances of the 11 interference filters $\lambda_1$ to $\lambda_{16}$, whose wavelengths are shorter than the cut-off wavelength of the filtering layer.

Figure 1D:
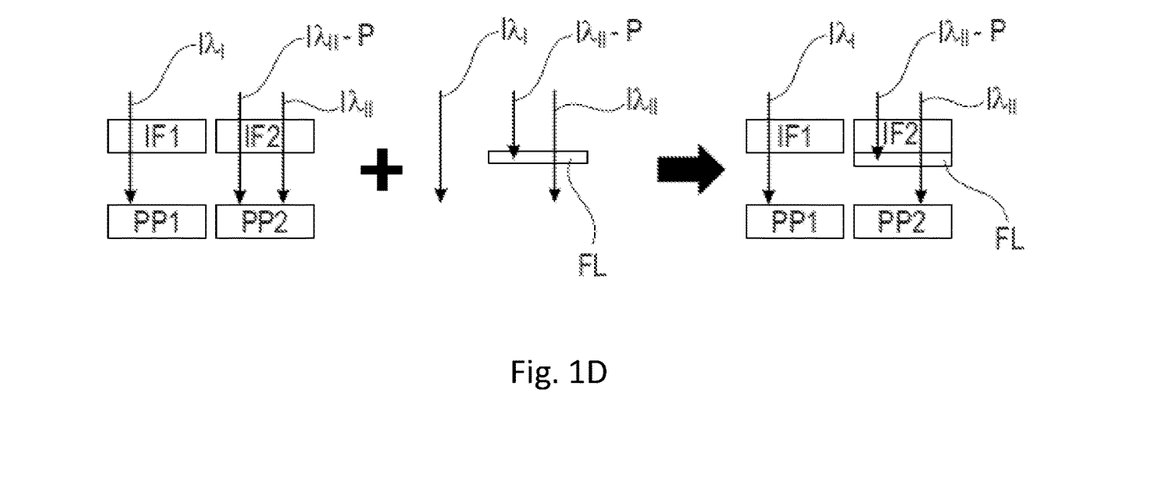
FIG. 1D shows a first variant of the general principle of the invention.

It can be seen that the filtering layer makes it possible to eliminate or very greatly reduce the transmission of the radiation due to the second-order resonance peaks, so as to obtain a spectral image with 16 bands covering a wide spectral domain and not suffering from any or much pollution caused by these second-order resonance peaks, according to the principle shown in FIG. 1D.

Solid arrows indicate the transmission peaks of the 11 photosensitive pixels dedicated to wavelengths $\lambda_6$ to $\lambda_{16}$, pixels on which the filtering layer 170 is superimposed.

FIG. 1D summarizes the general principle of the invention: A first interference filter IF1 superimposed on a first photosensitive pixel PP1 transmits a radiation I$\lambda_I$ with a wavelength belonging to a first spectral band of interest centered on the wavelength $\lambda_I$, a second interference filter IF2 superimposed on a second photosensitive pixel PP2 transmits a radiation I$\lambda_{II}$ of a second wavelength belonging to a second spectral band of interest centered on the wavelength $\lambda_{II}$ and a polluting radiation I$\lambda_{II}$-P with a third wavelength approximately half of $\lambda_{II}$ due to a second-order resonance of the second interference filter IF2, and a filtering layer FL which is configured to transmit I$\lambda_I$ to PP1 and I$\lambda_{II}$ to PP2, and to block the polluting radiation I$\lambda_{II}$-P at PP2.

In practice, it can be considered that the filtering layer FL also blocks radiation with a wavelength half of that of $\lambda_{II}$ at PP2.

The third, polluting wavelength of the radiation, I$\lambda_{II}$-P could be very close to or equal to $\lambda_1$, and could in particular be in a spectral band of interest centered on $\lambda_1$ corresponding to the first-order resonance peak of IF1, and therefore be transmitted by the first interference filter IF1.

The two spectral bands of interest are distinct, that is to say centered on different wavelengths, and preferably do not overlap.

A first variant of this principle, shown by FIG. 1D, consists of structuring the filtering layer FL so as to superpose it only on the second photosensitive pixel PP2.

In this document, the expression "approximately" means that a difference of 10% is allowed between the values of the magnitudes considered, and is in particular used to take into account the index dispersion when positioning the resonance peaks, Applying this principle to the first particular embodiment of the invention, $\lambda_I$ and $\lambda_{II}$ respectively correspond for example to $\lambda_1$ and $\lambda_{12}$, PP1 and PP2 to the photosensitive pixels 115 dedicated to the spectral bands centered on these wavelengths, IF1 and IF2 to the interference filters 160 superimposed respectively on PP1 and PP2, I$\lambda_I$ and I$\lambda_{II}$ to radiations transmitted by IF1 and IF2 by first-order resonance and I$\lambda_{II}$-P to the radiation transmitted by IF2 by second-order resonance, and the filtering layer FL to the filtering layer 170.

A multispectral imager applying the general principle of the invention to this first embodiment, combining an array of interference filters and a structured high-pass filter on the scale of the photosensitive pixels, makes it possible to analyze a spectral domain enlarged enough to comprise a first spectral band and a second spectral band of wavelengths approximately twice as short as those of the first spectral band without suffering from pollution due to the second-order resonance.

The application of the invention is not limited to the Fabry-Perot filters taken here as an example, but rather extends to any type of filter producing several orders of interference.

This first embodiment relies on the use of a filtering layer 170 forming a locally structured high-pass filter so as to be superimposed only on the photosensitive pixels dedicated to the high spectral bands in order to block the radiation transmitted by the second- and higher-order resonances of the associated interference filters, but the invention is not limited to this configuration and could employ other types of filters such as band-pass filters, whether or not they are superimposed on the set of photosensitive pixels defining a macro-pixel, as the following embodiment shows.

Description of a Second Particular Embodiment According to the Invention

Figure 4:
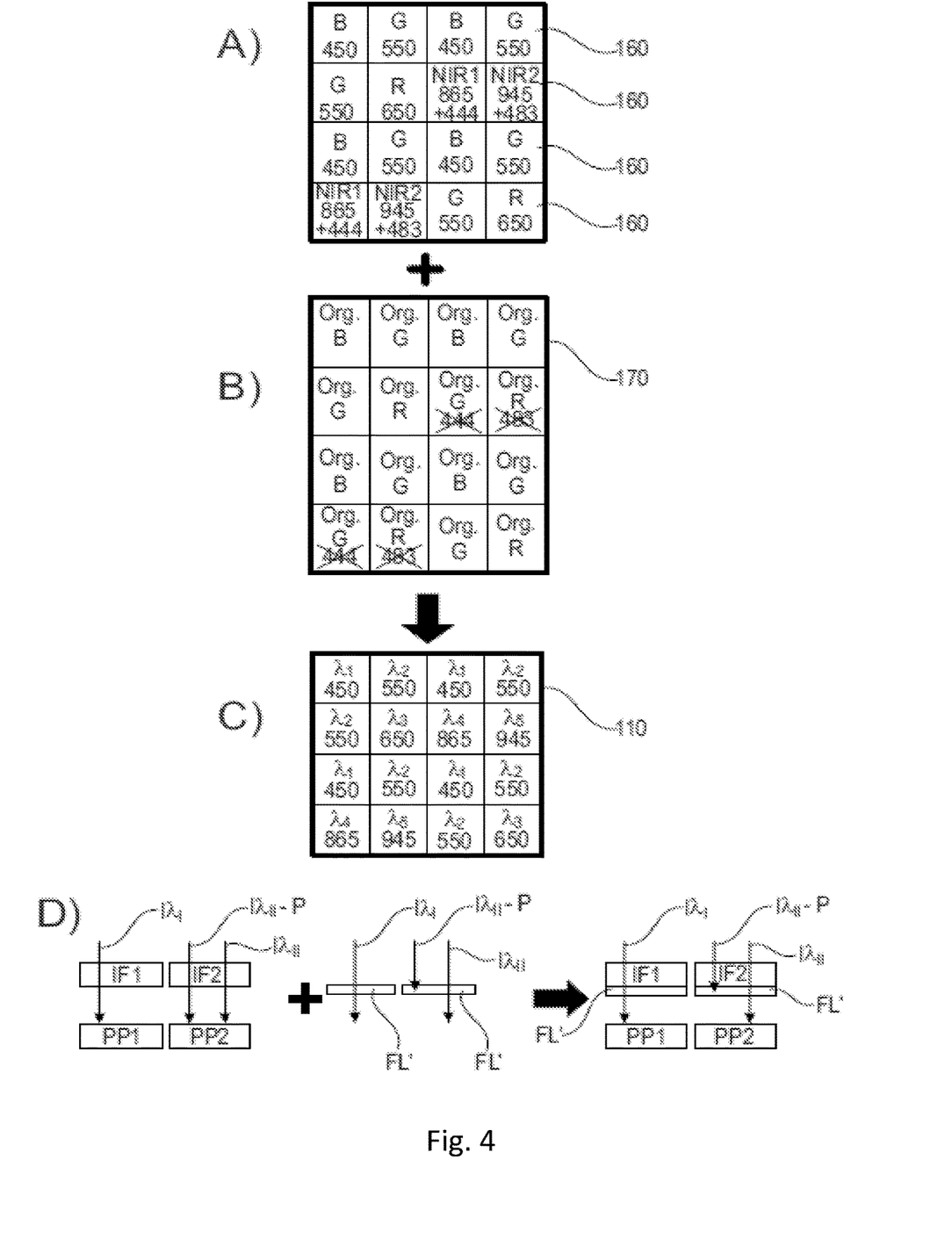
FIG. 4 shows the structure of the multispectral imager in FIG. 3.

The second embodiment of the invention consists of a 5-channel spectral imager having a structure identical to that of the first embodiment with the exception of interference filters and of the filtering layer, and comprising photosensitive pixels dedicated to 5 spectral bands centered on wavelengths $\lambda_1$ to $\lambda_5$, respectively 450, 550, 650, 865 and 945 nm, pixels arranged in macro-pixels 110 each comprising 16 photosensitive pixels as shown by FIG. 4 in C).

Figure 3:
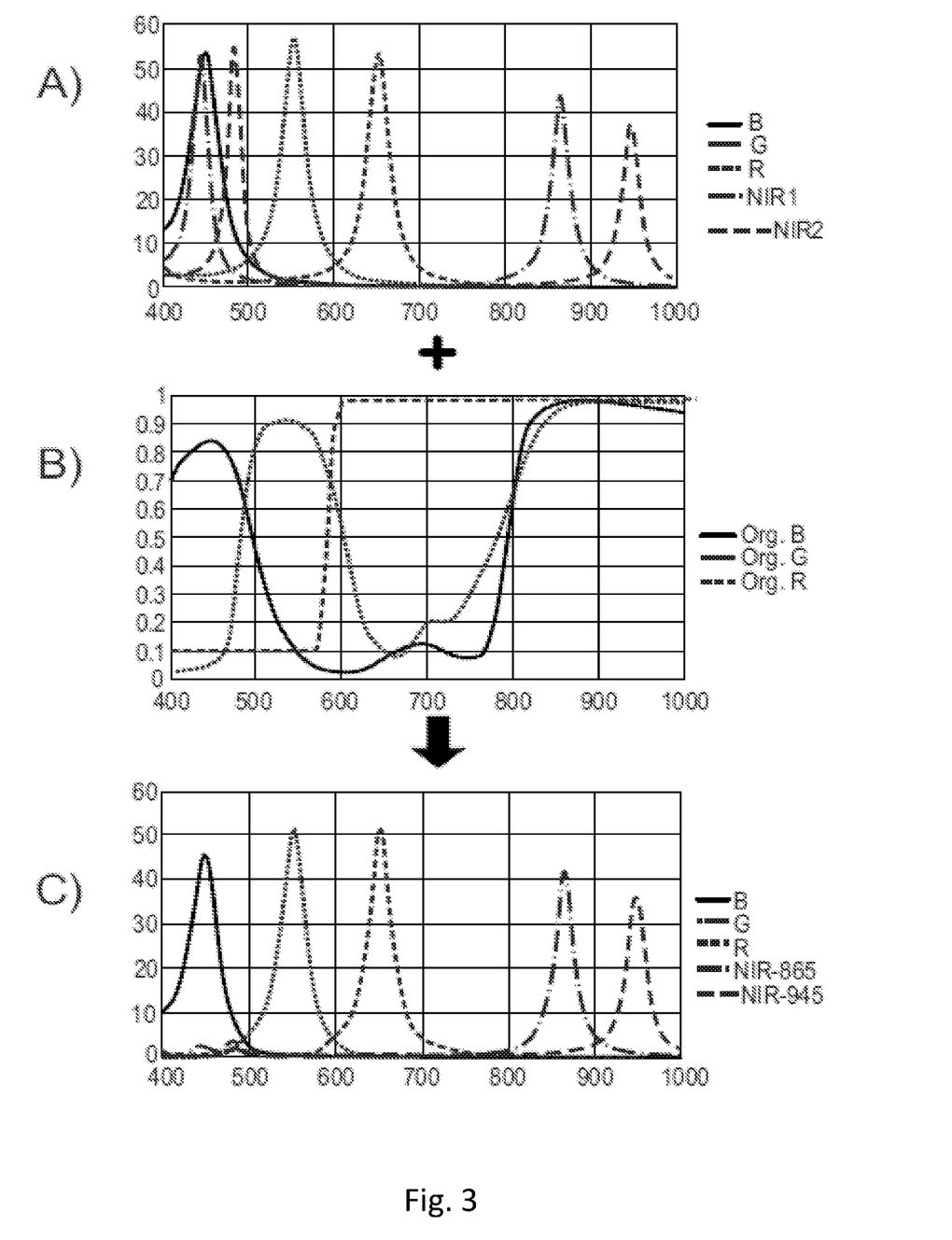
FIG. 3 shows the features of a multispectral imager according to a second embodiment of the invention.

The first three wavelengths correspond respectively to three interference filters B, G and R respectively transmitting blue, green and red radiation in the visible domain, the last two wavelengths corresponding respectively to two interference filters NIR1 and NIR2 of the near-infrared domain, FIG. 3 shows, in A), the spectral response of the five interference filters, with 5 transmission peaks corresponding respectively to the wavelengths $\lambda_1$ to $\lambda_5$ of first-order resonances of each of the 5 filters, and two transmission peaks at 444 and 483 nm corresponding respectively to the second-order resonances of the filters NIR1 and NIR2.

These last two transmission peaks are a source of pollution as explained in the first embodiment, and are eliminated or greatly reduced by using a filtering layer 170 formed of a mosaic of elementary filters, here a conventional Bayer array comprising organic filters Grg,B, Grg.G and Org.R transmitting blue, green and red radiation bands in the visible domain, respectively, as shown by FIG. 3 in B).

FIG. 4 shows, in A), the arrangement of the interference filters, according to the geometry of the macro-pixels 110, each filter being superimposed on one and only one of the photosensitive pixels of a given macro-pixel, with the first- and second-order resonance peaks of these filters.

The organic filters are arranged according to the geometry of the macro-pixel 110 as shown in B) of FIG. 4, each filter being superimposed on one and only one of the photosensitive pixels, and such that the filters NIR1 and NIR2 are respectively superimposed on Org.G and Org.R filters, so as to block the peaks of the peaks at 444 and 483 nm corresponding to the second-order resonances, respectively.

More specifically, the macro-pixel 110 is formed of a 2×2 array of four conventional Bayer matrices which are each formed of an array 2×2 elements; an Org.R red filter, an Org.B blue filter and two Org.G green filters, the two Org.G green filters being placed along a diagonal of the Bayer array.

The filters NIR1 and NIR2 are superimposed on an Org.G filter and an Org.R filter of each of two Bayer arrays placed along a diagonal of the macro-pixel 110.

The arrangement of the filters detailed above and shown in A) and B) of FIG. 4 is advantageous in the sense that it makes it possible on the one hand to use all the photosensitive pixels 115, each being dedicated to the detection of a wavelength likely to reach it, and on the other hand a high spatial resolution and at a high sensitivity combined with the possible use of a commercial photosensitive sensor already equipped with a Bayer array and mass-produced, thus being reasonably priced.

FIG. 3 illustrates in C) the result of the combination of the interference filters with the organic filters; the two peaks at 444 and 483 nm are extremely reduced, whereas the 5 peaks of the first-order resonances remain transmitted.

A second variant of the general principle of the invention, applied to this second particular embodiment of the invention, is summarized here in D) of FIG. 4; $\lambda_I$ and $\lambda_{II}$ respectively correspond for example to $\lambda_2$ and $\lambda_4$, PP1 and PP2 to the photosensitive pixels 115 respectively dedicated to the spectral bands of interest centered on these wavelengths, IF1 and IF2 to the interference filters G and NIR1 superimposed respectively on PP1 and PP2, $I\lambda_I$ and $I\lambda_{II}$ to radiations transmitted by IF1 and IF2 by first-order resonance, $I\lambda_{II}$-P to the radiation transmitted by IF2 by second-order resonance at 444 nm, and two parts of a filtering layer FL' to two Org.G elementary filters of the filtering layer 170 superimposed respectively on PP1 and PP2.

The two spectral bands of interest are distinct, that is to say centered on different wavelengths, and preferably do not overlap.

In this variant, the filtering layer is superimposed on the two photosensitive pixels, but it transmits $I\lambda_I$ at PP1 while blocking $I\lambda_{II}$-P at PP2 due to its spectral response which differs by pixel.

In practice, it can be considered that the filtering layer FL' also blocks radiation with a wavelength half of that of $\lambda_{II}$ at PP2.

Here, the organic filters form a Bayer array, transmitting in the blue, green and red of the visible spectral domain (particular type of so-called RGB filter), but other types of filtering arrays, and in general any type of filter taking the form of an array of filters and other transmission bands could be envisaged to design a spectral imager according to the invention, such as for example filters of the RGBE, RYYB, CYYM or even RGBW type.

The use of an image sensor equipped with a Bayer array in the multispectral imager is extremely advantageous insofar as such sensors are widely available at reasonable costs.

Figure 5:
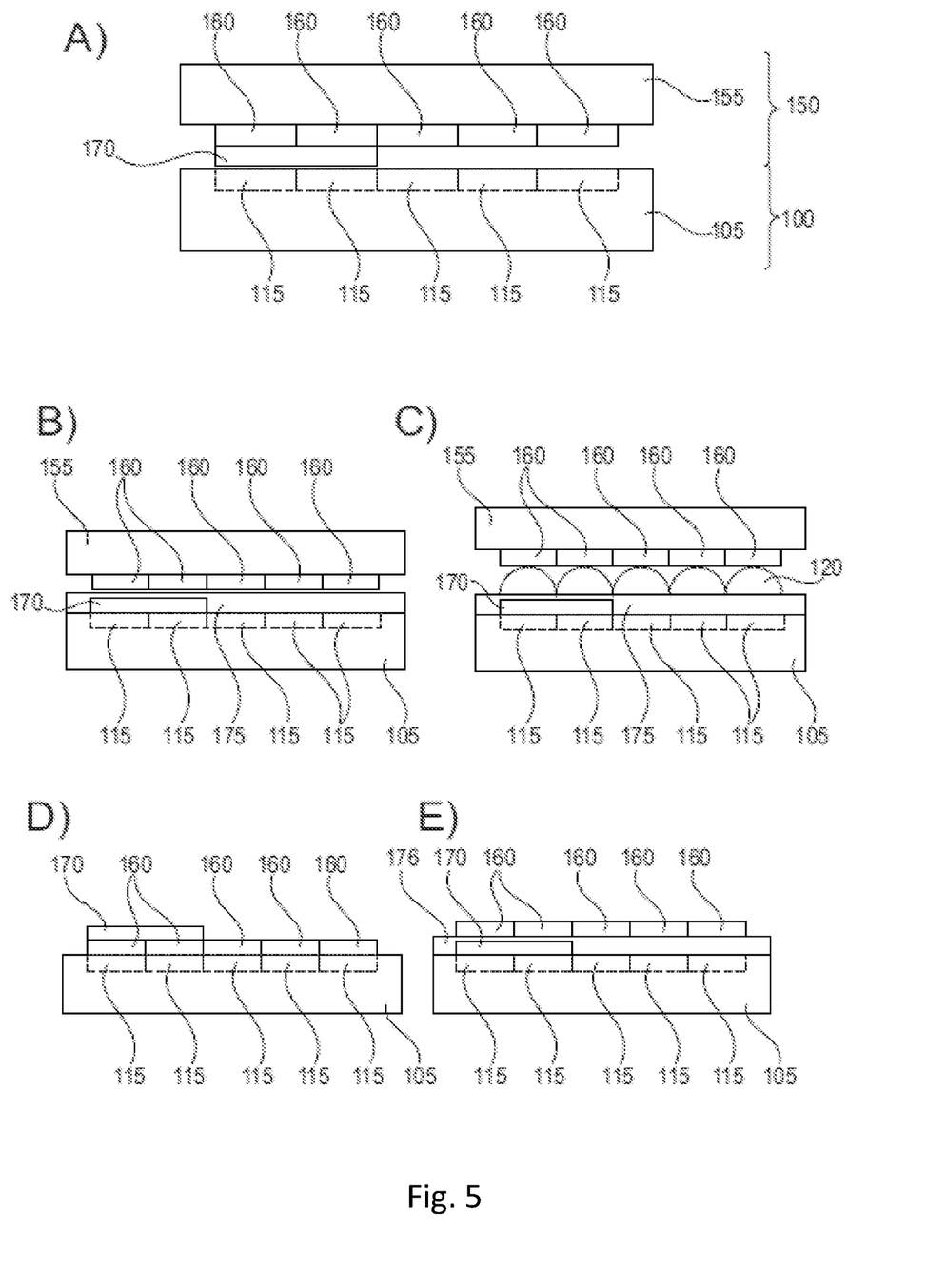
FIG. 5 shows variants of structures of a spectral imager according to the invention.

Furthermore, the spectral imager structure in FIG. 1A taken by way of example in the two embodiments above corresponds to a structure obtained by a hybrid technology, that is to say one which relies on the production in parallel of an image sensor and a filtering structure on two distinct substrates, then their association, including an array of lenses, but other structures are also suitable, like a hybrid structure identical to that of FIG. 1A but without lenses as shown by FIG. 5 in A), or a hybrid structure wherein the filtering layer 170 is formed on the sensor substrate and is optionally covered with a planarization layer 175, without or with an array of lenses above the planarization layer, as shown respectively in B) and C) of FIG. 5.

It is also possible to employ a structure obtained by a monolithic technology, that is to say obtained by the formation in succession of all the elements of the imager on a single substrate, as shown in D) and E) of FIG. 5, with respectively a superposition in this order of the photosensitive pixels 115, the interference filters 160 and the filter layer 170, and a superposition in this order of the photosensitive pixels 115, the filtering layer 170, optionally a planarization layer 176, and the interference filters 160.

It goes without saying that the present invention is not limited to the embodiments disclosed above, which are capable of undergoing modifications and being combined without departing from the scope of the invention.

What is claimed is:

1. A multispectral imager designed to analyze a spectral domain of interest comprising a first spectral band and a second spectral band distinct from the first spectral band, comprising:
    an image sensor formed of an array of macro-pixels each comprising a first photosensitive pixel and a second photosensitive pixel dedicated respectively to the first spectral band and to the second spectral band distinct from the first spectral band; and
    a filtering structure which comprises, for any given one of the macro-pixels, a first interference filter and a second interference filter which are superimposed respectively on the first photosensitive pixel and on the second photosensitive pixel and which are arranged to transmit respectively a first electromagnetic radiation belonging to the first spectral band and a second electromagnetic radiation belonging to the second spectral band,
    wherein:
    a wavelength half that of the second electromagnetic radiation is in the spectral domain of interest; and
    the multispectral imager further comprises a filtering layer which is, for the given one of the macro-pixels, superimposed on the second photosensitive pixel and which is configured to block passage of a third electromagnetic radiation with a wavelength half that of the second electromagnetic radiation, wherein (i) the filtering layer forms an organic high-pass filter configured to block the first electromagnetic radiation and transmit the second electromagnetic radiation or (ii) the filtering layer comprises an array of organic filters configured to each transmit a spectral band in the visible spectral domain,
    wherein:
    the first photosensitive pixel and the second photosensitive pixel are formed on and/or in a sensor substrate,
    the filtering structure comprises a filter substrate on which are formed the first interference filter and the second interference filter,
    the sensor substrate and the filter substrate are attached to each other,
    the first photosensitive pixel, the second photosensitive pixel, the first interference filter, the second interference filter, and the filtering layer are interposed between the sensor substrate and the filter substrate.

2. The multispectral imager according to claim 1, wherein the wavelength half that of the second electromagnetic radiation is in the first spectral band.

3. The multispectral imager according to claim 1, wherein the filtering layer is structured so as not to be superimposed on the first photosensitive pixel.

4. The multispectral imager according to claim 1, wherein the filtering layer is composed of a layer of red organic material.

5. The multispectral imager according to claim 1, wherein the filtering layer is formed of a mosaic of elementary filters juxtaposed to one another and that are each one of the interference filters of the filtering structure, one of the elementary filters being superimposed on the first photosensitive pixel and is configured to transmit the first electromagnetic radiation to the first photosensitive pixel.

6. The multispectral imager according to claim 1, wherein the organic filters are configured to transmit blue, green and red radiation bands respectively.

7. The multispectral imager according to claim 6, wherein the array of organic filters is a Bayer array.

8. The multispectral imager according to claim 1, wherein the sensor substrate and the filter substrate are attached to each other by means of a strip of glue.

9. The multispectral imager according to claim 1, wherein the filtering layer is formed on the sensor substrate.

10. The multispectral imager according to claim 9, wherein the filtering layer is covered with a planarization layer.

11. The multispectral imager according to claim 1, wherein the filtering layer is formed on the filter substrate.

12. The multispectral imager according to claim 1, wherein the first interference filter and the second interference filter are part of an array of interference filters, and wherein the filtering layer is formed on the filter substrate with the array of interference filters interposed inbetween.

* * * * *